(12) United States Patent
Drohan et al.

(10) Patent No.: US 8,452,515 B2
(45) Date of Patent: May 28, 2013

(54) SYSTEM AND METHOD FOR SIMULATING A GAS TURBINE COMPRESSOR

(75) Inventors: John Benjamin Drohan, Greer, SC (US); Randy Scott Rosson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/233,361

(22) Filed: Sep. 15, 2011

(65) Prior Publication Data

US 2013/0073170 A1 Mar. 21, 2013

(51) Int. Cl.
*G06F 19/00* (2011.01)
(52) U.S. Cl.
USPC ............... 701/100; 701/59; 701/99; 701/101; 701/104; 700/286; 700/287; 700/290
(58) Field of Classification Search
USPC ............. 701/59, 99, 100, 101, 104; 60/39.24, 60/39.25, 39.281, 39.901, 772; 702/34, 81, 702/85, 189; 700/286, 287, 290; 123/350; 703/7; 416/97 R
See application file for complete search history.

(56) References Cited

U.S. PATENT DOCUMENTS

| | | | |
|---|---|---|---|
| 7,605,747 B1 * | 10/2009 | Mookerjee et al. | 342/90 |
| 7,626,534 B1 * | 12/2009 | Boka et al. | 342/90 |
| 7,667,642 B1 * | 2/2010 | Frericks et al. | 342/357.57 |
| 7,742,904 B2 * | 6/2010 | Healy et al. | 703/7 |
| 7,822,512 B2 * | 10/2010 | Thatcher et al. | 700/287 |
| 7,853,392 B2 | 12/2010 | Healey et al. | |
| 7,877,173 B2 * | 1/2011 | Liu et al. | 701/13 |
| 2007/0073525 A1 * | 3/2007 | Healy et al. | 703/7 |
| 2007/0179763 A1 * | 8/2007 | Perchanok et al. | 703/7 |
| 2009/0012662 A1 * | 1/2009 | Liu et al. | 701/13 |
| 2009/0173078 A1 * | 7/2009 | Thatcher et al. | 60/773 |
| 2012/0070266 A1 * | 3/2012 | Schaberg et al. | 415/1 |

OTHER PUBLICATIONS

Co-pending and commonly assigned U.S. Appl. No. 13/232,279, filed on Sep. 14, 2011.

* cited by examiner

*Primary Examiner* — McDieunel Marc
(74) *Attorney, Agent, or Firm* — Dority & Manning, P.A.

(57) ABSTRACT

A method for simulating a compressor of a gas turbine may generally include determining a predicted pressure ratio and a predicted mass flow of the compressor based on a model of the gas turbine, monitoring an actual pressure ratio and an actual mass flow of the compressor, determining difference values between at least one of the predicted pressure ratio and the actual pressure ratio and the predicted mass flow and the actual mass flow, modifying the difference values using an error correction system to generate a compressor flow modifier and using the compressor flow modifier to adjust the predicted pressure ratio and the predicted mass flow.

20 Claims, 5 Drawing Sheets

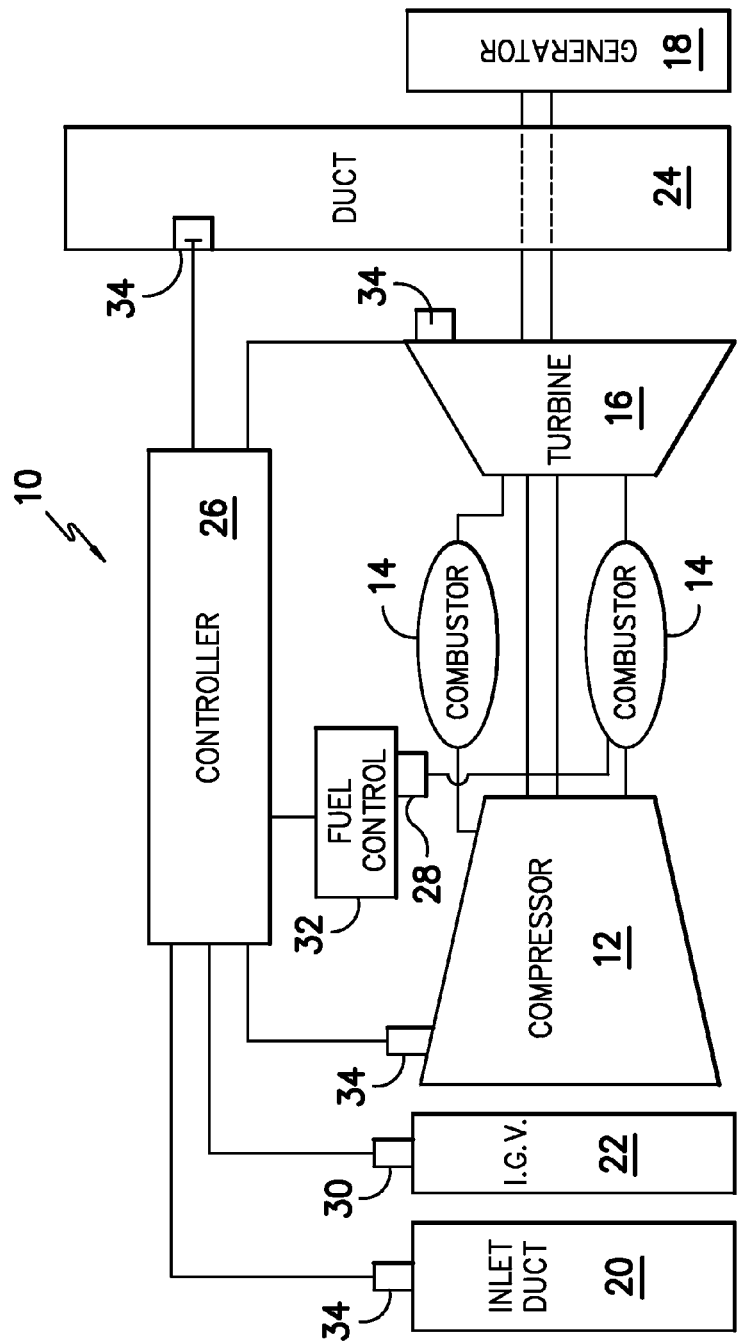
FIG. -1-

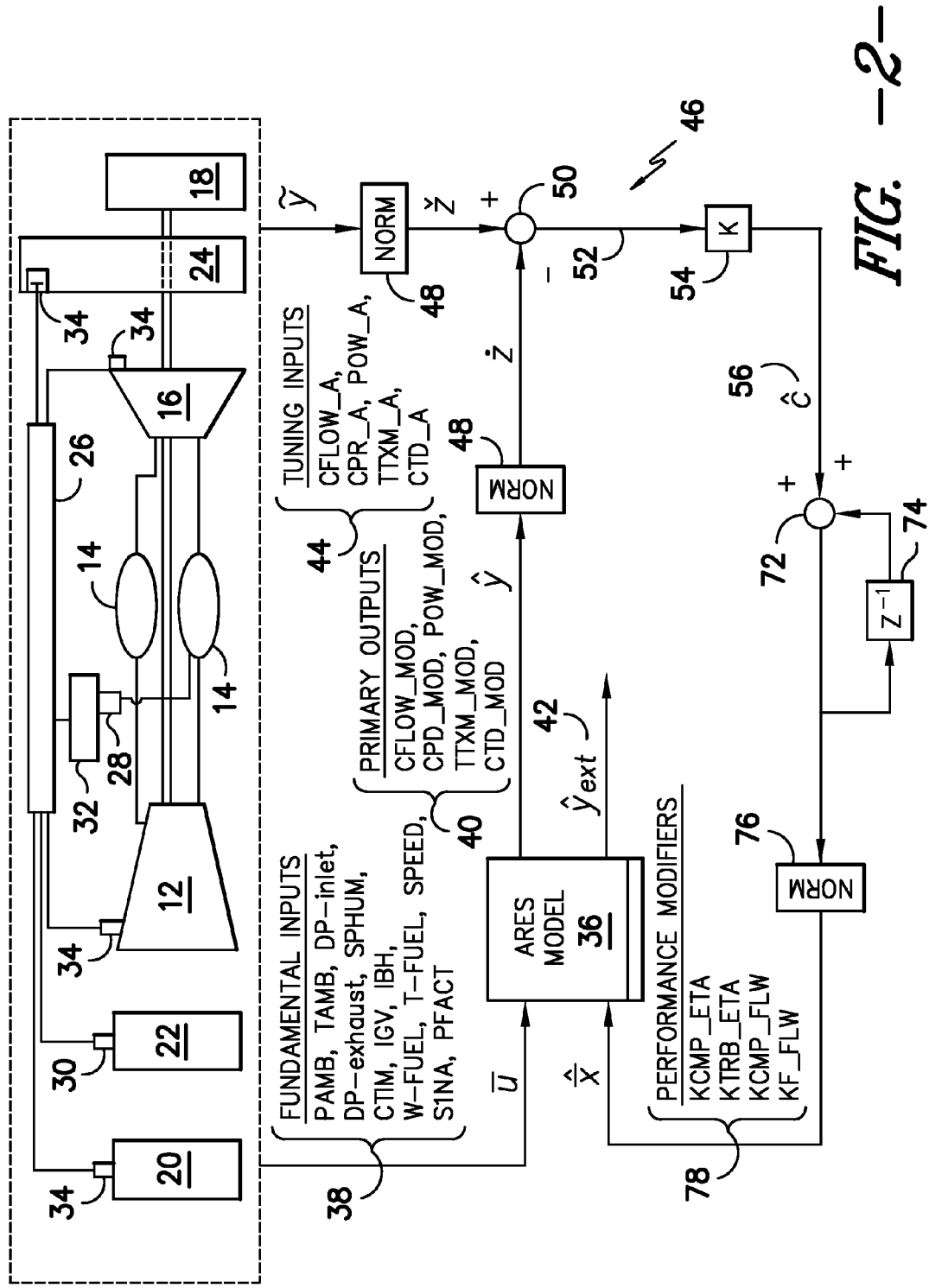
FIG. -2-

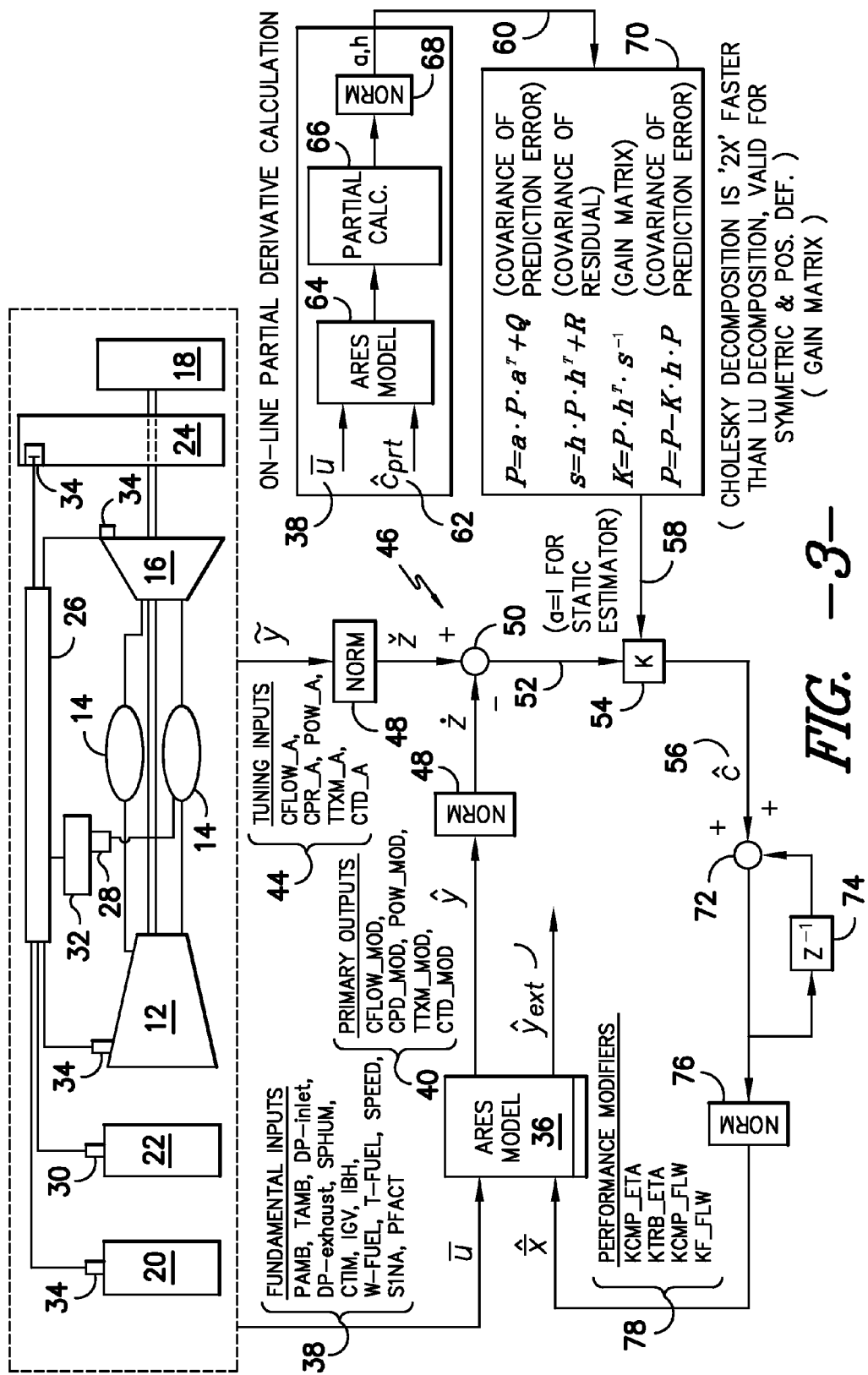
FIG. -3-

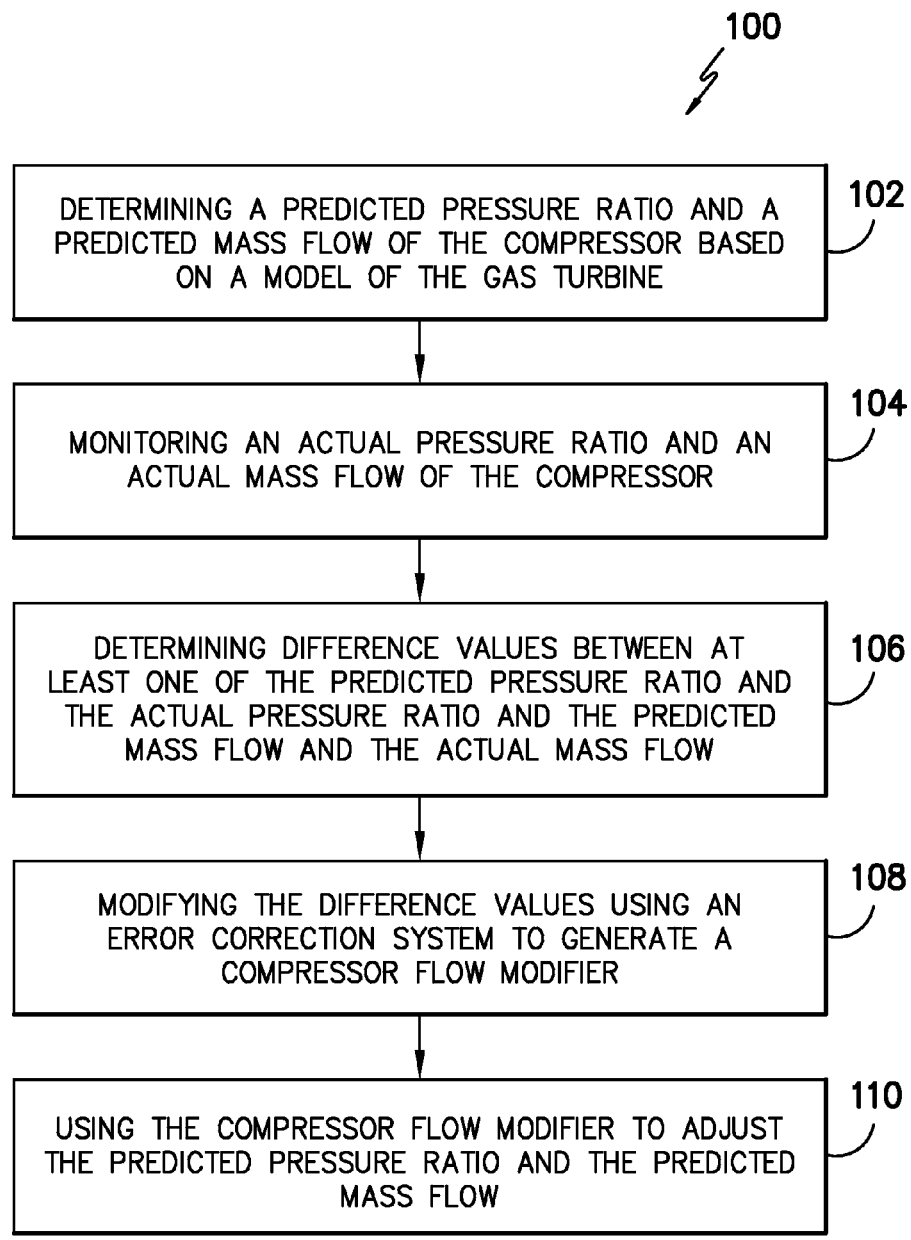
FIG. —4—

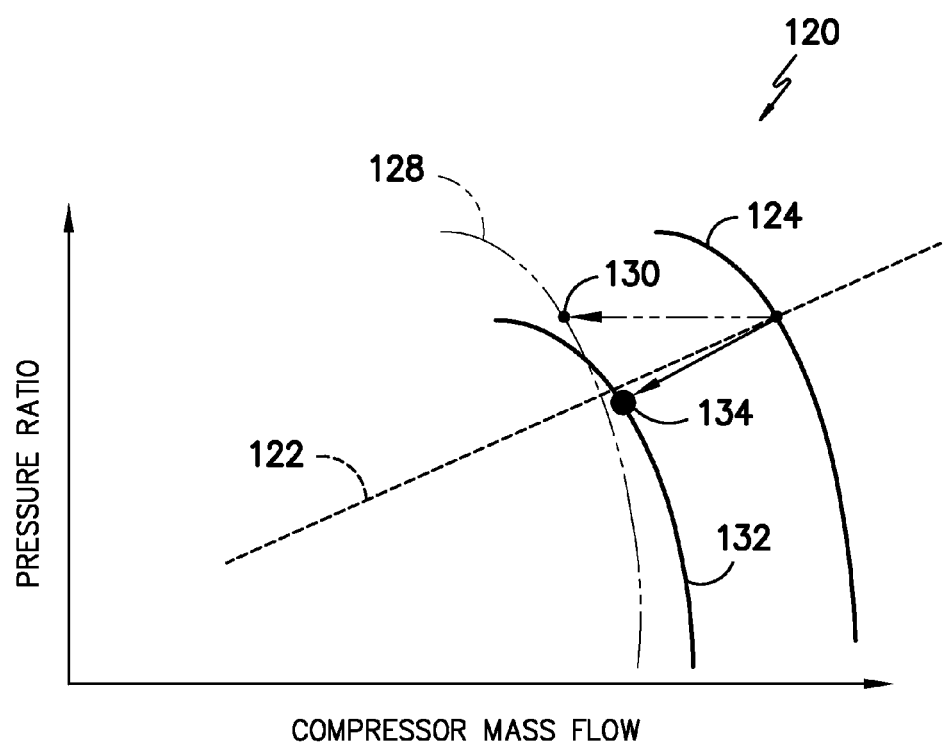
FIG. -5-

SYSTEM AND METHOD FOR SIMULATING A GAS TURBINE COMPRESSOR

FIELD OF THE INVENTION

The present subject matter relates generally to control systems for gas turbines and, more particularly, to a system and method for enhancing simulation of a gas turbine compressor.

BACKGROUND OF THE INVENTION

Industrial and power generation gas turbines have control systems ("controllers") that monitor and control their operation. These controllers govern the combustion system of the gas turbine and other operational aspects of the gas turbine. Typically, the controller executes scheduling algorithms that adjust the fuel flow, angle of the inlet guide vanes (IGV) and other control inputs to ensure safe and efficient operation of the gas turbine.

Gas turbine controllers typically receive input values of measured operating parameters and desired operating settings (e.g., power output, exhaust energy and the like) that, in conjunction with scheduling algorithms, determine settings for control parameters (e.g., fuel flow, combustor fuel splits, IGV angle, inlet bleed heat flow and the like) to achieve desired operation of the gas turbine. It is generally presumed that the values prescribed by the scheduling algorithms for the control parameters will cause the gas turbine to operate at a desired state, such as at a desired power output level and within defined emission limits. Thus, the scheduling algorithms incorporate assumptions regarding the gas turbine, such as that it is operating at a certain efficiency, with a certain flow capacity and at other assumed conditions. However, as the gas turbine operates for an extended period, component efficiencies tend to degrade and flow capacities and other operating conditions vary from the assumed conditions. Because of this deterioration, the scheduling algorithms become increasingly out of tune and cause the gas turbine to operate at states that increasingly diverge from the desired operational state.

To correct for changes in efficiency, flow capacity and other operating conditions, a gas turbine must be periodically "tuned." Typically, this entails an engineer or technician manually adjusting the gas turbine, which requires that the gas turbine be taken off-line to be instrumented for tuning. To prevent the downtime required for manual tuning, U.S. Pat. No. 7,742,904 (assigned to the General Electric Company) discloses a system and method that automatically adjusts the mathematical model for a gas turbine to account for changes (e.g., changes in component efficiencies and flow capacities) that occur during long term operation of the gas turbine. Specifically, the system and method utilizes differences in modeled and sensed operating parameters of the gas turbine to generate correction factors with a Kalman filter gain matrix, which may then be used to adjust the mathematical model of the gas turbine. While the system and method disclosed in U.S. Pat. No. 7,742,904 offer substantial advantages, it has been recognized that improvements may be made to such a system and method to further enhance the accuracy of the mathematical model. For instance, specific improvements to the methodology used to predict operating parameters of a gas turbine compressor may be implemented to fine tune the model and, thus, enhance simulation of the compressor.

Accordingly, a system and method for enhancing simulation of a gas turbine compressor would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for simulating a compressor of a gas turbine. The method may generally include determining a predicted pressure ratio and a predicted mass flow of the compressor based on a model of the gas turbine, monitoring an actual pressure ratio and an actual mass flow of the compressor, determining difference values between at least one of the predicted pressure ratio and the actual pressure ratio and the predicted mass flow and the actual mass flow, modifying the difference values using an error correction system to generate a compressor flow modifier and using the compressor flow modifier to adjust the predicted pressure ratio and the predicted mass flow.

In another aspect, the present subject matter discloses a method for simulating a compressor of a gas turbine. The method may generally include determining a predicted pressure ratio of the compressor based on a model of the gas turbine, using the predicted pressure ratio to determine a predicted mass flow of the compressor based on a compressor map of the model, monitoring an actual pressure ratio and an actual mass flow of the compressor, determining difference values between at least one of the predicted pressure ratio and the actual pressure ratio and the predicted mass flow and the actual mass flow, modifying the difference values using an error correction system to generate a compressor flow modifier and using the compressor flow modifier to adjust the predicted pressure ratio used with the compressor map to determine the predicted mass flow.

In a further aspect, the present subject matter discloses a system for simulating a compressor of a gas turbine. The system may generally include a plurality of sensors configured to monitor an actual pressure ratio and an actual mass flow of the compressor and a controller communicatively coupled to the sensors. The controller may be configured to generate a predicted pressure ratio and a predicted mass flow of the compressor based on a model of the gas turbine. Additionally, the controller may be configured to determine difference values between at least one of the predicted pressure ratio and the actual pressure ratio and the predicted mass flow and the actual mass flow. The controller may be further configured to apply an error correction system to the difference values in order to generate a compressor flow modifier, wherein the compressor flow modifier is used by the controller to adjust the predicted pressure ratio and the predicted mass flow.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic depiction of one embodiment of a gas turbine;

FIG. 2 illustrates a high level block diagram of one embodiment of a gas turbine, a gas turbine model and a error correction system for the gas turbine model;

FIG. 3 illustrates a block diagram similar to that show in FIG. 2, but includes a more detailed flow chart of one embodiment of the error correction system;

FIG. 4 illustrates a flow diagram of one embodiment of a method for simulating a gas turbine compressor; and FIG. 5 illustrates one embodiment of a compressor map correlating compressor pressure ratio to compressor mass flow.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a gas turbine control system and method that employs an adaptive gas turbine model to estimate operating parameters of an operating gas turbine. In particular, the gas turbine model may be configured to estimate operational parameters of a compressor of a gas turbine (as well as operational parameters of other components of the gas turbine) that are directly measured or sensed, which may then be compared to the corresponding measured or sensed values of such parameters. The comparison of such estimated and actual parameters may then be used to automatically tune the model as the gas turbine continues to operate. Specifically, in several embodiments, comparison of such estimated and actual parameters may be used to determine a compressor flow modifier, which may then be applied to the model to adjust predicted operational parameters of the compressor.

It should be appreciated that, in general, the gas turbine model may receive measured operating conditions as input parameters (e.g., ambient pressure, ambient temperature, inlet pressure differential, exhaust pressure differential, ambient specific humidity, compressor inlet temperature, inlet guide vane angle, inlet bleed heat flow, fuel flow, fuel temperature, generator speed, stage one nozzle area, generator power losses, inlet and exhaust duct pressure loses and/or the like). The gas turbine model may then generate estimated or predicted operating parameters for the gas turbine. For example, as indicated above, the model may generate predicted operating parameters for the compressor, such as compressor mass flow, compressor pressure ratio (i.e., the ratio of the compressor inlet pressure to the compressor discharge pressure) and/or the like. In addition, the model may generate other predicted operating parameters, such as exhaust gas temperature, compressor discharge temperature, power output and/or the like. The predicted operating parameters may then be used in conjunction with corresponding measured operating parameters to control the gas turbine. For example, the measured and predicted operating parameters may be input to control schedules to set the gas turbine operating state (e.g., desired turbine exhaust temperature, total combustor fuel flow, fuel split schedules, inlet bleed heat flow and/or the like). In addition, the measured and estimated operational parameters may be used to evaluate the accuracy of the model and/or to tune the model, as will be described in greater detail below.

The gas turbine model may be regularly, automatically and in real-time tuned using an error correction system. In several embodiments, the error correction system may comprise a Kalman filter. In general, the Kalman filter may receive inputs signals indicating the differences between measured operating parameters from various sensors and the predicted operating parameters output from the model. The Kalman filter may also receive as an input a Kalman filter gain matrix (KFGM), which generally corresponds to an array of numbers representing the uncertainty weighted sensitivity of the model estimated parameters to changes in model performance multipliers. Specifically, the KFGM may be calculated by an array of mathematical equations. These equations may receive as inputs a model sensitivity matrix (MSM) as well as estimates of the model and measurement uncertainty. The MSM may be calculated on-line in real-time by perturbation and evaluation of the control resident gas turbine model. The Kalman filter may use the supplied inputs to generate performance modifiers (e.g., performance multipliers) that may then be applied to tune the model and increase the accuracy of the estimated gas turbine parameters. For example, the Kalman filter may optimize the modifier values to minimize the differences between the estimated and measured operating parameters.

By using the Kalman filter, the gas turbine model may be adaptive to changing efficiencies, flow capacities and other parameters of the actual gas turbine. Specifically, the output performance modifiers generated by the Kalman filter adapt the model to better match the measured parameters of the gas turbine. In addition, the Kalman filter tunes the model to, for example, account for deterioration of component efficiencies, dilution flows and changes in air-flow capacities of the gas turbine that occur during extended operation.

It should be appreciated that, since the MSM and KFGM are calculated on-line and in real-time, the Kalman filter structure may also be able to adapt to changes in the number of available sensors and type of measured output parameters available to compare to the estimated output parameters of the model. For example, when an operating parameter of the gas turbine is no longer being measured, such as due to a sensor failure, the Kalman filter structure may be modified to account for the loss of the measured parameter, and, thus, may continue to generate performance multipliers based on the remaining measured conditions of the gas turbine.

Referring now to the drawings, FIG. 1 illustrates a simplified, schematic depiction of one embodiment of a gas turbine 10. In general, the gas turbine 10 may include a compressor 12, one or more combustors 14 and a turbine 16 drivingly coupled to the compressor 12. During operation of the gas turbine 10, the compressor 12 supplies compressed air to the combustor(s) 14. The compressed air is mixed with fuel and burned within the combustor(s) 14 and hot gases of combustion flow from the combustor(s) 14 to the turbine 16 in order to turn the turbine 16 and generate work, for example, by driving a generator 18.

Additionally, the gas turbine 10 may include an inlet duct 20 configured to feed ambient air and possibly injected water to the compressor 12. The inlet duct 20 may have ducts, filters, screens and/or sound absorbing devices that contribute to a pressure loss of ambient air flowing through the inlet 20 and into one or more inlet guide vanes 22 of the compressor 12. Moreover, the gas turbine 10 may include an exhaust duct 24 configured to direct combustion gases from the outlet of the turbine 16. The exhaust duct 24 may include sound adsorbing materials and emission control devices that apply a backpressure to the turbine 16. The amount of inlet pressure loss and back pressure may vary over time due to the addition of components to the ducts 20, 24 and/or due to dust and/or dirt clogging the inlet and exhaust ducts 20, 24.

Moreover, the gas turbine 10 may also include a controller 26. In general, the controller 26 may comprise any suitable processing unit (e.g., a computer or other computing device) capable of functioning as described herein. For example, in several embodiments, the controller 26 may comprise a General Electric SPEEDTRONIC Gas Turbine Control System, such as is described in Rowen, W. I., "SPEEDTRONIC Mark V Gas Turbine Control System," GE-3658D, published by GE Industrial & Power Systems of Schenectady, N.Y. The controller 26 may generally include one or more processors that execute programs, such as computer readable instructions stored in the controller's memory, to control the operation of the gas turbine 10 using sensor inputs and instructions from human operators. For example, the programs executed by the controller 26 may include scheduling algorithms for regulating fuel flow to the combustor(s) 14. As another example, the commands generated by the controller 26 may cause actuators on the gas turbine to, for example, adjust valves (e.g., actuator 28) between the fuel supply and the combustor(s) 14 that regulate the flow, fuel splits and type of fuel flowing to the combustors 14, adjust the angle of the inlet guide vanes 22 (e.g., by using actuator 30) of the compressor 12 and/or to activate other control settings for the gas turbine 10.

The scheduling algorithms may enable the controller 26 to maintain, for example, the NOx and CO emissions in the turbine exhaust to within certain predefined emission limits, and to maintain the combustor firing temperature to within predefined temperature limits. Thus, it should be appreciated that the scheduling algorithms may utilize various operating parameters as inputs. The controller 26 may then apply the algorithms to schedule the gas turbine 10 (e.g., to set desired turbine exhaust temperatures and combustor fuel splits) so as to satisfy performance objectives while complying with operability boundaries of the gas turbine 10.

Referring still to FIG. 1, a fuel control system 32 may be configured to regulate the fuel flowing from a fuel supply to the combustor(s) 14, the split between the fuel flowing into primary and secondary fuel nozzles and/or the amount of fuel mixed with secondary air flowing into the combustion chamber of the combustor(s) 14. The fuel control system 32 may also be adapted to select the type of fuel for the combustor(s) 14. It should be appreciated that the fuel control system 32 may be configured as a separate unit or may comprise a component of the main turbine controller 26.

Additionally, in several embodiments of the present subject matter, operation of the gas turbine 10 may be monitored by a plurality of sensors 34 detecting various operating parameters of the gas turbine 10, the generator 18 and/or the ambient environment. In many instances, two or more sensors 34 may be utilized to measure the same operating parameters. For example, a plurality of redundant temperature sensors 34 may monitor the ambient air temperature, compressor inlet temperature, compressor discharge temperature, turbine exhaust gas temperature, fuel temperature and/or other temperatures of the fluids flowing through the gas turbine 10. Similarly, a plurality of redundant pressure sensors 34 may monitor ambient air pressure and static and dynamic pressure levels at the compressor inlet and outlet, turbine exhaust and at other locations at which fluids are flowing through the gas turbine 10. Moreover, a plurality of redundant humidity sensors 34 (e.g., wet and dry bulb thermometers) may measure ambient specific humidity within the inlet duct 20 of the compressor 12. Further, a plurality of redundant sensors 34 may also comprise flow sensors (e.g., fuel flow sensors, air flow sensors, inlet bleed heat flow sensors, other mass flow sensors and/or the like), speed sensors (e.g., turbine shaft speed sensors), flame detector sensors, valve position sensors, guide vane angle sensors and/or the like that sense various other parameters pertinent to the operation of the gas turbine 12.

As indicated above, in several embodiments of the present subject matter, one or more operating parameters of the compressor 12 (e.g., compressor mass flow, compressor pressure ratio and/or the like) may be monitored by the controller 26. Thus, a plurality of sensors 34 may be disposed at various locations within and/or adjacent to the compressor 12 to allow such operating parameters to be monitored. For example, one or more pressure sensors 34 (e.g., a plurality of redundant pressure sensors 34) may be disposed within and/or adjacent to the compressor inlet and compressor outlet to permit the compressor pressure ratio to be monitored. Similarly, one or more flow sensors 34 (e.g., a plurality of redundant flow sensors 34) may be disposed within and/or adjacent to the compressor 12 to allow the mass flow through the compressor 12 to be monitored.

It should also be appreciated that, as used herein, the term "parameter" refers to an item(s) that may be used to define the operating conditions of the gas turbine 10, such as temperatures, pressures, air flows, gas flows, gas concentrations, turbine speeds, humidity and the like at defined locations in the gas turbine 10. Some parameters may be measured (e.g., using sensors 34) and, thus, may be directly known. Other parameters may be estimated using the gas turbine model and, thus, may be indirectly known. The measured and/or estimated parameters may generally be used to represent a given turbine operating state.

Referring now to FIG. 2, a high-level block diagram of one embodiment of a gas turbine 10 and an adaptive real-time engine simulation model 36 (ARES) configured to electronically model, in real-time, several operating parameters of the gas turbine 10 is illustrated in accordance with aspects of the present subject matter. As shown, the gas turbine 10 has several observable parameters that are herein referred to as "fundamental inputs" ($\bar{u}$) 38. The fundamental inputs 38 may be directly measured by sensors (e.g., sensors 34) and may include (without limitation): ambient conditions, such as the ambient air pressure (PAMB) and ambient air temperature (TAMB), inlet pressure differential (DP-inlet) (i.e., the pressure differential between the ambient air pressure and the pressure of the air exiting the inlet duct 26 and entering the compressor 20), exhaust pressure differential (DP-exhaust) (i.e., the pressure differential between the ambient air pressure and the pressure of the exhaust gases flowing through the exhaust duct 30), specific humidity of the ambient air (SPHUM), compressor inlet temperature (CTIM), angle of the inlet guide vanes 28 (IGV), inlet bleed heat flow (IBH) (i.e., the percentage of the compressor flow redirected to the compressor inlet), flow rate of the fuel supplied to the combustor(s) 22 (W-FUEL), temperature of the fuel (T-FUEL), rotational speed of the turbine shaft (SPEED), effective area of the stage one nozzle of the turbine 24 (S1NA) and power factor of the generator 18 (PFACT).

The listed fundamental inputs 38 are exemplary and are provided merely to illustrate one example of sensed inputs that may be collected. Thus, it should be appreciated that the specific fundamental inputs 38 of the model 36 are not material to this disclosure and may vary depending on, for example, the type of controller 26 used, the specific model 36 applied and/or the sensors (34) available at a particular gas turbine installation. In other words, it should also be appreciated that the term "fundamental" does not imply or require that each and every one of the measured parameters described above must be input into the gas turbine model 36 disclosed herein or that any such gas turbine model 36 must have these inputs. Thus, the fundamental inputs 38 may only include some of the measured parameters described above and/or may include other measured operating parameters of the gas turbine 10. The term fundamental inputs 38 merely indicates that, for the particular embodiment of the model 36 disclosed herein, these inputs may be taken from measurements of actual turbine conditions and may be applied as inputs to the model 36.

As shown in FIG. 2, the fundamental inputs 38 may be input into the model 36 and may be applied by the model 36 to generate output values ($\hat{y}$ and $\hat{y}_{ext}$) 40, 42 corresponding to predicted operating parameters of the gas turbine 10. Specifically, the output values may include primary modeled outputs ($\hat{y}$) 40 that may be compared to corresponding measured operating parameters ($\tilde{y}$) 44 (i.e., tuning inputs) of the gas turbine 10. In addition, the modeled output values may include extended modeled outputs ($\hat{y}_{ext}$) 42 that correspond to predicted gas turbine parameters (e.g., desired fuel flow rate, flame temperature and/or the like) that are not directly measured. The extended modeled outputs 42 may be used by the controller 26 to operate and/or control the gas turbine 10, such as by applying the desired fuel flow rate to control the actual fuel flow rate to the combustor(s) 14.

To ensure that the modeled outputs ($\hat{y}$ and $\hat{y}_{ext}$) 40, 42 accurately predict the operating parameters of the gas turbine 10, the primary modeled outputs 40 and their corresponding tuning inputs 44 may be applied to an error correction system 46 configured to automatically and regularly tune the model 36. The modeled outputs 40, 42 may then be used for controlling the gas turbine 10, scheduling maintenance and/or predicting the performance of the gas turbine 10.

As shown in the illustrated embodiment, the primary modeled outputs 40 may include, but are not limited to, a modeled compressor mass flow (CFLOW_MOD), a modeled compressor pressure ratio (CPR_MOD), a modeled power output (POW_MOD), such as to the generator 18, a modeled turbine exhaust temperature (TTXM_MOD) and a modeled compressor discharge temperature (CTD_MOD). However, in alternative embodiments, it should be appreciated that the primary modeled outputs 40 may any other suitable number and/or combination of operating parameters that may be both predicted by the model 36 and measured using one or more sensors disposed on or within the gas turbine 10. It should also be appreciated that the primary modeled outputs 40 may vary during operation of the gas turbine 10 if, for example, a sensor fails and the tuning input 44 corresponding to the primary modeled output 40 is no longer available for comparison.

As indicated above, each of the primary modeled outputs 40 may correspond to a measured or sensed operating parameter ($\tilde{y}$) 44 (i.e., a tuning input) of the gas turbine 10. For example, in the illustrated embodiment, the tuning inputs 44 include actual compressor mass flow (CFLOW_A), actual compressor pressure ratio (CPR_A), actual power output (POW_A), actual turbine exhaust temperature (TTXM_A) and actual compressor discharge temperature (CTD_A).

Each of these tuning inputs 44 may be based on output signals of sensors (e.g., sensors 34) monitoring the corresponding actual parameter of the gas turbine 10. As indicated above, multiple redundant sensors may observe each of the measured parameters. Additionally, it should be appreciated that tuning inputs 44 may vary from gas turbine to gas turbine. Thus, the tuning inputs 44 may be selected based on, for example, the type of controller 26 used, the specific model 36 applied and/or the sensors (34) available at a particular gas turbine installation.

It should also be appreciated that the model 36 may generally comprise a computer implemented, mathematical model of the gas turbine 10. For example, the model 36 may comprise an arrangement of mathematical representations of the primary and extended modeled outputs 40, 42, as well as a plurality of assumptions regarding the gas turbine 10, stored within the memory of the controller 26, with the mathematical representations and/or assumptions being used to generate an estimated value of one or more of the modeled outputs 40, 42. Specifically, in several embodiments, the model 36 may comprise a physics-based aero-thermodynamic computer model of the gas turbine 10, a regression-fit model of the gas turbine 10, neural-net model of the gas turbine 10, or any other suitable mathematical model of the gas turbine 12. It should also be appreciated that the development of such a model 36 is well within the purview of one of ordinary skill in the art and, thus, need not be described herein.

Referring still to FIG. 2, as indicated above, the primary modeled outputs 40 may be compared to the tuning inputs 44 in order to tune the model 36. Specifically, the primary modeled outputs 40 and tuning inputs 44 may be normalized 48 to generate normalized modeled outputs ($\dot{z}$) and normalized tuning outputs ($\check{z}$). Each corresponding pair of normalized outputs ($\dot{z},\check{z}$) may then be compared 50 (e.g., CFLOW_MOD may be compared to CFLOW_A), to generate a difference signal ($\Delta(\dot{z},\check{z})$) 52, such as ($\Delta$(CFLOW_MOD, CFLOW_A)). The difference signal 52 may generally indicate an error of the modeled output parameter 40 with respect to the tuning input 44. For example, in one embodiment, the difference signal 52 may indicate the error between the predicted mass flow of the compressor 12 and the actual mass flow of the compressor 12.

It should be appreciated that, in several embodiments, there may be at least one difference signal 52 corresponding to each of the primary modeled outputs 40 and/or there may be a difference signal 52 corresponding to each of the redundant sensors measuring a particular parameter of the tuning inputs 44. Additionally, it should be appreciated that at least one tuning input 44 may be necessary for each primary modeled output 40 to generate a difference signal 52. Thus, if one or more of the tuning inputs 44 is not available (e.g., due to a failed sensor) the corresponding difference signals 52 may be generated, but the error correction system 46 may still operate to tune the model 36.

Additionally, the error correction system 46 may be used to generate correction factors or modifiers for the model 36 based on the difference signals 52. For instance, in several embodiments, a Kalman filter gain matrix (KFGM-K) 54 may receive as an input the difference signals 52 in order to generate corrected and normalized difference signals (i.e., normalized correction factor adjustments ($\hat{c}$) 56) that may be used to tune the gas turbine model 36. As shown in FIG. 3, the KFGM 54 may apply tuning factors 58 to adjust the difference signals 52 and generate the normalized correction factors 56. In one embodiment, a relatively large number of difference signals 52 (e.g., redundant sensor outputs for each tuning input 44) may enable the KFGM 54 to generate normalized correction factors 56 that may be used to accurately tune the model 36 and ensure that the model 36 generates accurate output values 40, 42.

It should be appreciated that the loss of difference signals 52 may reduce (but not eliminate) the ability of the KFGM 54 to tune the model 36. Specifically, the adaptive ability of the KFGM 54 may enable it to continue to tune the model 36 with a reduced set of difference signals 52. To automatically tune the model 36 when one or more of the difference signals 52 is not available, the KFGM 54 may be modified to account for the loss of a difference signal(s) 52. Accordingly, the gas turbine 10 can continue to operate and be automatically tuned even when sensors fail and tuning input data regarding observable operating parameters is not available.

Referring now to FIG. 3, one embodiment of the mechanism by which the KFGM 54 may be created is illustrated in accordance with aspects of the present subject matter. As shown, a model sensitivity matrix (MSM) (a, h) 60 may be determined by applying a series of inputs, such as fundamental inputs 38 and a series of perturbated performance multipliers 62 ($\hat{c}_{prt}$) (e.g., perturbated corrected and normalized difference signals 52) to a gas turbine model 64 (e.g., the model 36). The sensitivity of the primary outputs of the model 64 may be determined by a partial derivative analysis 66. Additionally, the sensitivity values may be normalized 68 to form the MSM (a, h) 60. The MSM 60 may be applied to an on-line filter gain calculation 70 (e.g., Kalman filter equations) to determine a matrix of optimal tuning factors 58 (e.g., gain values) that may be applied to the difference signals 52 corresponding to the differences between the measured tuning inputs 44 and the corresponding values 40 predicted by the model 36.

The Kalman filter equations used for the on-line filter gain calculation 70 are shown in FIG. 3. The use of such equations are well known to persons of ordinary skill in the art as an optimal recursive data processing algorithm.

As shown in FIG. 3, the KFGM 54 may receive one or more tuning factors 58 that may be applied to the difference signals 52 to generate normalized correction factor adjustments 56. The normalized correction factors 56 may then be summed 72 with the prior normalized correction factor ($Z^{-1}$) 74 to average out the differences between the current and prior correction factors 56, 74. The averaged correction factor may then be un-normalized 76 to produce performance modifiers 78 (also un-normalized correction factors) that may include, for example, component efficiency modifiers, such as a compressor efficiency modifier (KCMP_ETA) and a turbine efficiency modifier (KTRB_ETA), and flow capacity modifiers, such as a compressor flow modifier (KCMP_FLW) and a heat consumption modifier (KF_FLW) (e.g., the ratio of the predicted heat consumption to the actual heat consumption). The un-normalized correction factors or performance modifiers 78 may then be applied to the gas turbine model 36 as, for example, multipliers and/or add-ons that may be applied to the equations and/or algorithms that model the gas turbine 10 and generate the modeled outputs 40, 42. Specifically, the performance modifiers 78 may tune the model 36 by adjusting the equations and/or algorithms so that they generate modeled outputs 40, 42 that accurately represent the actual operation of the gas turbine 10. For example, as will be described below with reference to FIGS. 4 and 5, the compressor flow modifier (KCMP_FLW) may be used to adjust the compressor pressure ratio and compressor mass flow predicted by the model 36 in order to more accurately simulate the operation of the compressor 12 The modeled outputs 40, 42 may then be applied to determine fuel and air flow to the gas turbine 10, to determine other control inputs to the gas turbine 10, to determine the power output of the gas turbine 10 and/or to determine any other operating parameters of the gas turbine 10.

Referring now to FIG. 4, one embodiment of a method 100 for enhancing simulation of a gas turbine compressor 12 using the model 36 and error correction system 46 described above with reference to FIGS. 2 and 3 is illustrated in accordance with aspects of the present subject matter. As shown, the method 100 generally includes determining a predicted pressure ratio and a predicted mass flow of the compressor based on a model of the gas turbine 102, monitoring an actual pressure ratio and an actual mass flow of the compressor 104, determining difference values between at least one of the predicted pressure ratio and the actual pressure ratio and the predicted mass flow and the actual mass flow 106, modifying the difference values using an error correction system to generate a compressor flow modifier 108 and using the compressor flow modifier to adjust the predicted pressure ratio and the predicted mass flow 110.

In general, the disclosed method 100 may be utilized to fine tune the gas turbine model 36 in order to provide a more accurate representation of the operation of the compressor 12. Specifically, by using the compressor flow modifier output from the error correction system 46 to adjust the compressor pressure ratio and the compressor mass flow predicted by the model 36, the disclosed method 100 may provide a means for adapting the model 36 to more accurately account for degradation and/or wear and tear that may occur on or within the compressor 12.

As shown in FIG. 4, in 102, a predicted compressor pressure ratio and a predicted compressor mass flow may be determined using the gas turbine model 36. As indicated above, the model 36 may generally be utilized to estimate operating parameters of the gas turbine 100 using any inputs (e.g., fundamental inputs 38) and/or assumptions supplied to the model 36. For instance, the compressor pressure ratio may be predicted by the model 36 using any suitable operating parameters, such as ambient air pressure (PAMB), inlet pressure differential (DP-inlet), specific humidity of the ambient air (SPHUM), angle of the inlet guide vanes 28 (IGV), inlet bleed heat flow (IBH) and/or various other operating parameters, that may be input into the model 36 and utilized to calculate the pressure ratio based on the mathematical representations and/or assumptions forming part of the model 36. Similarly, the compressor mass flow may be predicted by the model 36 using any number of suitable operating parameters and/or assumptions input into the model 36.

In several embodiments of the present subject matter, the compressor mass flow may be predicted by the model 36 using the predicted compressor pressure ratio. Specifically, the equations and/or algorithms of the model 36 may be adapted to correlate the predicted compressor pressure ratio to the compressor mass flow based on a given operating state of the gas turbine 10. For example, FIG. 5 illustrates one embodiment of a compressor map 120 that may be used to correlate the predicted compressor pressure ratio to the predicted compressor mass flow for a given operating state (e.g., a given IGV angle). In other words, the compressor map 120 may generally correspond to a graphical representation of the equations and/or algorithms that may be used by the model 36 to predict the compressor mass flow based on the compressor pressure ratio. As shown in FIG. 5, an operating line 122 is provided on the compressor map 120 that generally illustrates the operational relationship between the compressor pressure ratio and the compressor mass flow for an ideal compressor (e.g., a new compressor having no degradation or defects). Thus, for such an ideal compressor at a given operating speed (indicated by the constant speed line 124) and a specific predicted pressure ratio, a predicted mass flow of the compressor 12 may be determined that generally corresponds to a point 126 along the operating line 122. However, as will be described below, the predicted mass flow of the compressor 12 may be adjusted to account for degradation and/or wear and tear to the compressor 12.

Referring back to FIG. 4, in 104, the actual compressor pressure ratio and the actual compressor mass flow is monitored. As indicated above, such operating parameters may be monitored using a plurality of sensors (e.g., sensors 34) disposed within and/or adjacent to the compressor 12. Specifically, these sensors may transmit suitable mass flow and pressure measurements to the turbine controller 26 for subsequent analysis and/or processing (e.g., by using the measurements to determine the difference values set forth in 106 of the disclosed method 100).

Additionally, in 106 and 108, difference values may be determined between at least one of the predicted pressure ratio and the actual pressure ratio and the predicted mass flow and the actual mass flow, with such difference values then being modified using an error correction system to generate a compressor flow modifier. For example, as described above with reference to FIGS. 2 and 3, the difference values 52 obtained by comparing the predicted and measured compressor operating conditions may be input into the Kalman filter gain matrix (KFGM-K) 54 in order to generate corrected and normalized difference signals (i.e., a normalized correction factor adjustments ($\hat{c}$) 56). Such correction factors 56 may then be processed (e.g., summed and/or averaged with prior correction factors, un-normalized, and/or the like) in order to produce the compressor flow modifier and/or any other suitable performance modifiers 78.

Moreover, in 110, the compressor flow modifier may be used to adjust the predicted compressor pressure ratio and the predicted compressor mass flow. Specifically, the compressor flow modifier may be used to adjust how the disclosed model 36 predicts the compressor pressure ratio and compressor mass flow so that such predicted operating parameters may more accurately represent the actual pressure ratio and mass flow of the compressor 12.

As an example, the actual mass flow of the compressor 12 at a given operating speed may decrease over time due to degradation and/or wear and tear occurring on or within the compressor 12 (e.g., due to increasing roughness of the airfoils within the compressor 12 and/or due to other wear and tear on the components of the compressor 12). Thus, to ensure that the predicted compressor mass flow output by the model 36 provides an accurate estimation of the actual mass flow through the compressor 12, the compressor flow modifier may be used to adjust the predicted mass flow. For instance, as shown in FIG. 5, the compressor flow modifier may be used to adjust the predicted compressor mass flow by migrating the constant speed line 124 across the compressor map 120 (e.g., by varying the predicted compressor mass flow until the mass flow satisfies continuity for the entire thermodynamic cycle occurring within the gas turbine 10) to account for degradation and/or wear and tear occurring on or within the compressor 12. However, as shown in FIG. 5, if the compressor mass flow is the only parameter adjusted using the compressor flow modifier (e.g., by migrating the constant speed line from 124 to the dashed line 128 at a constant compressor pressure ratio), the corresponding predicted compressor mass flow may be defined at a point 130 on the compressor map 120 that significantly deviates from the normal operating line 122. Accordingly the compressor mass flow predicted by the model 36 may vary substantially from the actual compressor mass flow (due, at least in part, to the compressor map distortion), which may provide an inaccurate representation of the actual efficiency of the compressor 12, thereby impacting the scheduling algorithms and other control settings applied by the controller 26.

Thus, in accordance with aspects of the present subject matter, the compressor flow modifier may also be utilized to adjust the predicted compressor pressure ratio, with this adjusted pressure ratio then being used to predict the compressor mass flow. For instance, in several embodiments, the compressor pressure ratio predicted by the model 36 may be based upon the compressor flow modifier and a gain factor. Specifically, in a particular embodiment, the model 36 may predict the compressor pressure ratio according to the following equation:

$$PR\_PRED = (PR\_MAP-1)*[(KCMP\_FLW-1)*GAIN+1]+1$$

where, PR_PRED corresponds to the predicted pressure ratio at the current machine state, PR_MAP corresponds to an unadjusted pressure ratio predicted by the model 36 (e.g., an unadjusted, predicted pressure ratio assuming an ideal compressor), KCMP_FLW corresponds to the current compressor flow modifier input into the model 36 and GAIN corresponds to a gain factor provided to the model 36.

By adjusting the predicted pressure ratio using the compressor flow modifier, the compressor mass flow predicted by the model 36 may more accurately represent the actual mass flow of the compressor 12. In particular, as shown in FIG. 5, by adjusting the predicted pressure ratio according (e.g., by using the equation above), the corresponding predicted compressor mass flow, after migrating the constant speed line from 124 to 132 in accordance with the compressor flow modifier and the adjusted pressure ratio, may be defined at a point 134 on the compressor map 120 much closer to the normal operating line 122. As a result, the adjustments made to the model 36 using the compressor flow modifier may track the actual operating conditions of the compressor 12 more closely, thereby significantly increasing the accuracy of the entire model 36. In other words, the modification may actually reflect the degradation and/or wear and tear occurring on or within the compressor 12 instead of simply reflecting distortion of the compressor map 120.

It should be appreciated that the gain factor may generally correspond to a predetermined value that may be used to further tune the accuracy of the model with respect to the operation of the compressor 12 by providing additional flexibility in adjusting the compressor pressure ratio. Thus, the gain factor may be selected based upon the understanding of the operation of the particular gas turbine 10 with which the present subject matter is being used. For example, in one embodiment, the gain factor may be equal to one. However, in other embodiments, the gain factor may be any other number, such as a number greater than one or a number less than one.

It should also be appreciated that the technical effect of the present matter is improved control, performance and/or operation of a gas turbine 10. In particular, by adjusting the compressor pressure ratio and mass flow predicted by the gas turbine model 36 using the compressor flow modifier, the operation of the compressor 12 may be more accurately simulated, thereby enhancing the control, performance and/or operation of the gas turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for simulating a compressor of a gas turbine, the method comprising:
   determining, with a processor, a predicted pressure ratio and a predicted mass flow of the compressor based on a model of the gas turbine;
   monitoring an actual pressure ratio and an actual mass flow of the compressor;
   determining, with the processor, difference values between at least one of the predicted pressure ratio and the actual pressure ratio and the predicted mass flow and the actual mass flow;
   modifying the difference values using an error correction system to generate a compressor flow modifier;
   using the compressor flow modifier to adjust the predicted pressure ratio and the predicted mass flow.

2. The method of claim 1, wherein determining a predicted pressure ratio and a predicted mass flow of the compressor based on a model of the gas turbine comprises determining the predicted mass flow based on a compressor map of the model, the compressor map relating the predicted pressure ratio to the predicted mass flow.

3. The method of claim 2, wherein using the compressor flow modifier to adjust the predicted pressure ratio and the predicted mass flow comprises using the compressor flow modifier to adjust the predicted pressure ratio used with the compressor map to determine the predicted mass flow.

4. The method of claim 1, wherein using the compressor flow modifier to adjust the predicted pressure ratio and the predicted mass flow comprises adjusting the predicted pressure ratio as a function of the compressor flow modifier and a gain factor.

5. The method of claim 4, wherein adjusting the predicted pressure ratio as a function of the compressor flow modifier and a gain factor comprises adjusting the predicted pressure ratio according to the equation:

$$PR\_PRED = (PR\_MAP - 1) * [(KCMP\_FLW - 1) * GAIN + 1] + 1$$

wherein $PR_{13}$ PRED corresponds to the predicted pressure ratio, $PR_{13}$ MAP corresponds to an unadjusted pressure ratio, KCMP_FLW corresponds to the compressor flow modifier and GAIN corresponds to the gain factor.

6. The method of claim 1, wherein modifying the difference values using an error correction system to generate a compressor flow modifier comprises modifying the difference values using a Kalman filter gain matrix continuously generated in real-time during operation of the gas turbine to generate the compressor flow modifier.

7. The method of claim 1, wherein monitoring an actual pressure ratio and an actual mass flow of the compressor comprises monitoring the actual pressure ratio and the actual mass flow with a plurality of sensors disposed within or adjacent to the compressor.

8. A method for simulating a compressor of a gas turbine, the method comprising:
   determining, with a processor, a predicted pressure ratio of the compressor based on a model of the gas turbine;
   using the predicted pressure ratio to determine a predicted mass flow of the compressor based on a compressor map of the model;
   monitoring an actual pressure ratio and an actual mass flow of the compressor;
   determining, with the processor, difference values between at least one of the predicted pressure ratio and the actual pressure ratio and the predicted mass flow and the actual mass flow;
   modifying the difference values using an error correction system to generate a compressor flow modifier;
   using the compressor flow modifier to adjust the predicted pressure ratio used with the compressor map to determine the predicted mass flow.

9. The method of claim 8, wherein using the compressor flow modifier to adjust the predicted pressure ratio used with the compressor map to determine the predicted mass flow comprises adjusting the predicted pressure ratio as a function of the compressor flow modifier and a gain factor.

10. The method of claim 9, wherein adjusting the predicted pressure ratio as a function of the compressor flow modifier and a gain factor comprises adjusting the predicted pressure ratio according to the equation:

$$PR\_PRED = (PR\_MAP - 1) * [(KCMP\_FLW - 1) * GAIN + 1] + 1$$

wherein $PR_{13}$ PRED corresponds to the predicted pressure ratio, $PR_{13}$ MAP corresponds to an unadjusted pressure ratio, KCMP_FLW corresponds to the compressor flow modifier and GAIN corresponds to the gain factor.

11. The method of claim 8, wherein monitoring an actual pressure ratio and an actual mass flow of the compressor comprises monitoring the actual pressure ratio and the actual mass flow with a plurality of sensors disposed within or adjacent to the compressor.

12. The method of claim 8, wherein modifying the difference values using an error correction system to generate a compressor flow modifier comprises modifying the difference values using a Kalman filter gain matrix continuously generated in real-time during operation of the gas turbine to generate the compressor flow modifier.

13. A system for simulating a compressor of a gas turbine, the system comprising:
   a plurality of sensors configured to monitor an actual pressure ratio and an actual mass flow of the compressor;
   a controller communicatively coupled to the plurality of sensors, the controller being configured to generate a predicted pressure ratio and a predicted mass flow of the compressor based on a model of the gas turbine, the controller being further configured to determine difference values between at least one of the predicted pressure ratio and the actual pressure ratio and the predicted mass flow and the actual mass flow, the controller being further configured to apply an error correction system to the difference values in order to generate a compressor flow modifier,
   wherein the compressor flow modifier is used by the controller to adjust the predicted pressure ratio and the predicted mass flow.

14. The system of claim 13, wherein the controller is configured to determine the predicted mass flow of the compressor based on the predicted pressure ratio and a compressor map of the model, the compressor map relating the predicted pressure ratio to the predicted mass flow.

15. The system of claim 14, wherein the compressor flow modifier is used by the controller to adjust the predicted pressure ratio used with the compressor map to determine the predicted mass flow.

16. The system of claim 13, wherein the controller is configured to adjust the predicted pressure ratio as a function of the compressor flow modifier and a gain matrix.

17. The system of claim 13, wherein the controller is configured to adjust the predicted pressure ratio according to the equation:

$$PR\_PRED = (PR\_MAP-1)*[(KCMP\_FLW-1)*GAIN+1]+1$$

wherein $PR_{13}PRED$ corresponds to the predicted pressure ratio, $PR_{13}PRED-1$ corresponds to an unadjusted pressure ratio, KCMP_FLW corresponds to the compressor flow modifier and GAIN corresponds to the gain factor.

18. The system of claim 13, wherein the controller comprises a turbine controller of the gas turbine.

19. The system of claim 13, wherein the plurality of sensors are disposed within or adjacent to the compressor.

20. The system of claim 13, wherein the error correction system comprises a Kalman filter gain matrix continuously generated by the controller in real-time during operation of the gas turbine.

* * * * *